(12) United States Patent
Kühn et al.

(10) Patent No.: US 10,704,811 B2
(45) Date of Patent: Jul. 7, 2020

(54) SORPTION COOLING DEVICE

(71) Applicant: Coolar UG, Berlin (DE)

(72) Inventors: Roland Wolfgang Kühn, Berlin (DE); Kilian Mähne, Berlin (DE); Julia Römer, Berlin (DE)

(73) Assignee: Coolar UG, Berlin (DE)

( * ) Notice: Subject to any disclaimer, the term of this patent is extended or adjusted under 35 U.S.C. 154(b) by 117 days.

(21) Appl. No.: 15/875,456

(22) Filed: Jan. 19, 2018

(65) Prior Publication Data

US 2018/0209698 A1    Jul. 26, 2018

(30) Foreign Application Priority Data

Jan. 20, 2017   (DE) .................. 10 2017 101 058

(51) Int. Cl.
| | |
|---|---|
| *F25B 17/02* | (2006.01) |
| *B62J 7/06* | (2006.01) |
| *B62J 9/21* | (2020.01) |
| *B62J 7/08* | (2006.01) |

(52) U.S. Cl.
CPC .............. *F25B 17/02* (2013.01); *B62J 7/06* (2013.01); *B62J 9/21* (2020.02); *B62J 7/08* (2013.01)

(58) Field of Classification Search
CPC ........ F25B 17/02; F25B 17/08; F25B 17/083; F25B 43/046; B62J 9/003; B62J 7/06; B62J 7/08
See application file for complete search history.

(56) References Cited

U.S. PATENT DOCUMENTS

| | | | |
|---|---|---|---|
| 293,556 A | 2/1884 | Bradbury | |
| 1,916,030 A * | 6/1933 | Allyne .................... | F25B 17/02 62/482 |
| 1,978,520 A * | 10/1934 | Willsie .................... | F25B 17/00 62/479 |
| 2,240,173 A | 4/1941 | Coons et al. | |
| 2,525,431 A * | 10/1950 | Sorensen ................ | F25B 17/02 62/106 |
| 3,141,307 A | 7/1964 | Beardslee | |
| 5,816,069 A * | 10/1998 | Ebbeson ................ | F25B 35/04 62/457.9 |
| 5,881,573 A * | 3/1999 | Ebbeson ................ | F25B 17/08 62/480 |
| 2009/0217680 A1* | 9/2009 | Petersen ............... | F25B 43/046 62/85 |
| 2016/0231021 A1* | 8/2016 | Roetker ................. | F25B 17/02 |
| 2016/0273802 A1* | 9/2016 | Roetker ................. | F25B 17/02 |

FOREIGN PATENT DOCUMENTS

| | | |
|---|---|---|
| DE | 102 21 187 A1 | 12/2002 |
| DE | 10 2005 056 245 A1 | 6/2007 |
| DE | 10 2014 2232 079 A1 | 5/2015 |
| EP | 1 416 233 A2 | 5/2004 |
| FR | 2 530 791 A1 | 1/1984 |
| KR | 20010035537 A | 5/2001 |
| WO | WO 99/18398 A1 | 4/1999 |

OTHER PUBLICATIONS

Office Action for German Application No. DE102017101058.0, dated May 12, 2020.

* cited by examiner

*Primary Examiner* — Emmanuel E Duke
(74) *Attorney, Agent, or Firm* — Wolf, Greenfield & Sacks, P.C.

(57) ABSTRACT

A sorption cooling device includes at least one evaporator, a condenser and a sorption chamber.

13 Claims, 8 Drawing Sheets

SORPTION COOLING DEVICE

CROSS REFERENCE TO RELATED APPLICATIONS

Figure 1:
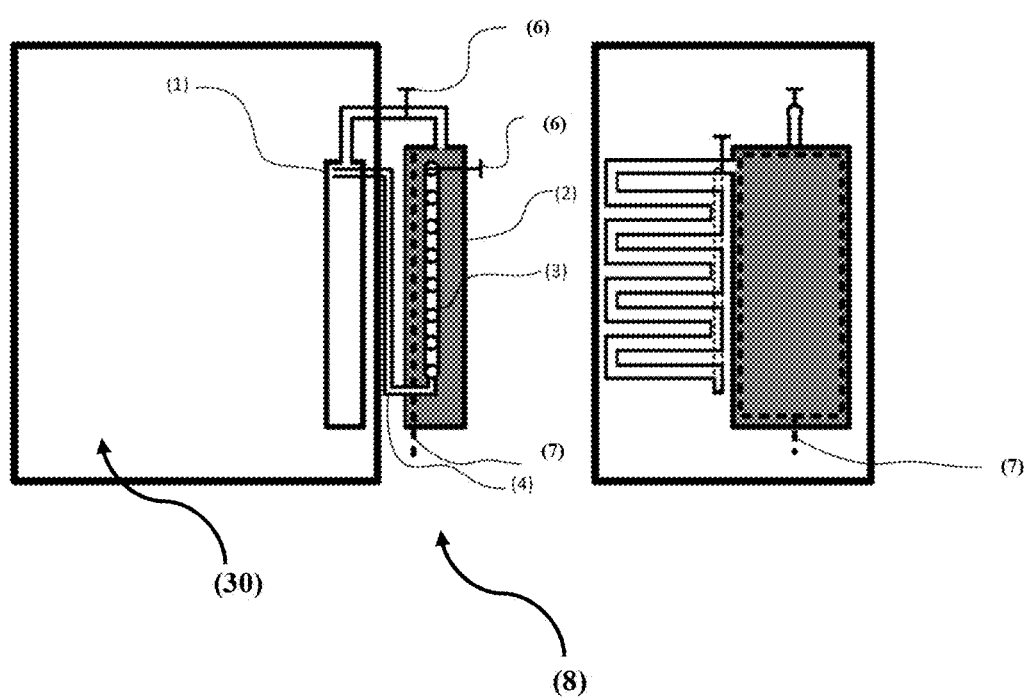

Foreign priority benefits are claimed under 35 U.S.C. § 119(a)-(d) or 35 U.S.C. § 365(b) of German application number 102017101058.0, filed Jan. 20, 2017. The entire contents of this application is incorporated herein by reference in its entirety.

The invention relates to a sorption cooling device comprising at least one evaporator, a condenser and a sorption chamber.

DESCRIPTION

In the prior art, industrial thermally operated absorption and adsorption cooling installations are known, which are actively cooled by means of recooling installation and in which the cold provided via pumps is introduced into the system to be cooled. Disadvantages of these installations are that both the recooling installation and also the pumps are usually operated with electrical energy, for example, current, so that such an installation cannot be operated without the connection to an energy supply network or without another supply of electrical energy.

In addition, very small thermally driven cooling installations are known, which are passively cooled, so that no energy supply is needed for the recooling. However, such installations can only be driven at high operating temperatures electrically or by burning gas. Such very small installations can be used, for example, as hotel refrigerators, wherein primarily one cooling space is cooled. These so-called gas diffusion absorption cooling installations contain an inert gas which compensates for pressure differences but at the same time prevents mass transfer. For conveying the sorption solution, a bubble pump is used, which is thermally operated and requires additional thermal energy for the operation.

In the prior art, prototypes for adsorption refrigerators are known, in which the condensing refrigerant stream is partially condensed in the evaporator, whereby, disadvantageously, internal heat loads in the cooling space are generated. Such a cooling device is disclosed in DE 10 2005 056 245, for example. At the same time, for this purpose, high operating temperatures of 200° C. to 300° C. are necessary, as described in EP 1 416 233.

The above-mentioned cooling installations have in common that the condenser is arranged above the evaporator in order to convey the condensed refrigerant by force of gravity into the evaporator. In addition, in absorption cooling installations, the desorber is arranged above the absorber, as is known.

In order to reduce the pressure difference between condenser and evaporator or between desorber and absorber, a throttle device is provided in many conventional cooling installations. In advantageous compression cooling installations, such as refrigerators, capillary tubes are used, which reduce the pressure energy in the narrow cross section as a result of pressure losses. In industrial compression cooling installations, there are automatic expansion valves which are regulated based on pressure or temperature differences, but they are considerably more expensive than a capillary tube. In sorption cooling installations, long U tubes are typically used.

In a departure therefrom, in adsorption refrigerators, a usually completely connected system of pipes and at most one valve are used, in which approximately the same pressure prevails at all sites within the system, whereby such adsorption refrigerators consisting of evaporator, condenser and sorption chamber are used as a whole for desorbing/condensing or evaporating/adsorbing. Thus, these known systems must be cyclically completely cooled and heated, resulting disadvantageously in additional energy consumption. In addition, disadvantageously, refrigerant also always condenses in the evaporator due to this design, and the cooling space together with the evaporator is heated temporarily, since, in this time period, in particular, no new cold can be generated in the evaporator.

Industrial absorption and adsorption cooling installations differ considerably from very small sorption cooling installations which are used, for example, in refrigerators. In order not to have to use wearing and/or mechanically moving component parts such as pumps, either a bubble pump is used for the medium conveyance, which requires additional thermal energy for the drive, or a fixed adsorbent is used. In the case of very small adsorption cooling installations, due to the simple design, hot refrigerant is partially condensed in the evaporator during the operation, whereby an additional heat load is imposed on the cooling space, which is associated with an increased cooling need. The cooling installations known in the prior art therefore clearly reduce the efficiency of such very small cooling installations. At the same time, the U tubes used both in industrial and also in very small sorption cooling installations for pressure throttling between the higher container with higher pressure, for example, the condenser, and the lower-lying container with low pressure, for example, the evaporator, have the disadvantage that they can be purged by pressure surges or randomly generated vapor bubbles, whereby a direct pressure blowback from the high-pressure container into the low-pressure container occurs. As a result, disadvantageously, the process can come to a temporary stop. In order to prevent pressure blowback, additional throttle devices, for example, perforated sheets, are routinely built in, which prevent the generation of vapor bubble columns or reduce the speed of the blowback. Due to this additional pressure loss, the raised arrangement of the condenser in comparison to the evaporator becomes indispensible, in order to reliably overcome the pressure loss. In the sense of the invention, it is preferable to refer to the container in a higher position according to the prior art, which is preferably is supplied in its interior with a higher pressure than the container in a deeper position according to the prior art, as a high-pressure container, while the container in a lower position according to the prior art, which is preferably supplied in its interior with a lower pressure than the high-pressure container, is referred to as a low-pressure container.

An additional disadvantage in the prior art consists in that, in conventional cooling installations, it is not possible to reserve a refrigerant quantity in the sump of the usually higher-lying condenser, since the condenser sump, due to its higher arrangement in comparison to the evaporator within the cooling installation, can run dry if additional refrigerant is not provided sufficiently rapidly, for example, by recondensation. This disadvantage occurs particularly if no additional valves or additional throttle devices are provided in the connection between condenser and evaporator, which, however, is usually the case. If water or ethanol is used as refrigerant or if another refrigerant is used, which is provided for the operation at low pressure, the use of a capillary tube is also not always possible without difficulty due to the forming vapor bubbles. Tests have shown that this applies particularly in the case of cooling installations of low power, for example, a power of less than 1 kW. Then, the cross section of the capillary tube has to be selected to be so small that the capillary forces present as a result no longer allow through-flow of liquid refrigerant with the aid of the low pressure difference present. Due to the low flow rate of the refrigerant in such small installations, the use of perforated sheets is also not possible, since a very large number of perforated sheets with very small cross section would be needed, which would not be justifiable economically. Therefore, in known very small sorption cooling installations, an auxiliary gas is usually used, which has the known disadvantages. In the thermally driven cooling installations known from the prior art, the evaporator therefore has to be attached lower, i.e., deeper, than the condenser, although, for example, in the case of direct cooling of a space by the evaporator, the optimal position for the evaporator is located as far as possible at the top in the cooling space. Placing the evaporator in such a structure as far as possible at the top then represents a challenge particularly in the case of small available space.

Accordingly, the underlying aim of the invention is to provide a sorption cooling device which does not have the indicated deficiencies or disadvantages of the prior art and, in particular, which can be operated without electrical energy supply, and in which, at the same time, a purging of the connection between high-pressure and low-pressure containers can be prevented effectively. In addition, the sorption cooling device should have a high energy efficiency.

DESCRIPTION OF THE INVENTION

According to the invention, the aim is achieved by means of a sorption cooling device comprising at least one evaporator, a condenser and a sorption chamber, wherein an outlet from the condenser is present connected by means of a connection means to an inlet into the evaporator, wherein the outlet from the condenser is arranged deeper within the sorption cooling device than the inlet into the evaporator, and the sorption chamber is present arranged fluidically between the outlet from the evaporator and the inlet into the condenser.

In the sense of the invention, it is preferable that the sorption chamber is also present connected to the evaporator and the condenser, wherein these connections can be implemented, for example, with pipes as connection means.

In the sense of the invention, it is preferable that the connection means is designed as a primary throttle device. In the sense of the invention, this means preferably that, in the context of the proposed sorption cooling device, no separate component part for the purpose of throttling is present arranged in the connection means between condenser and evaporator, but, instead, the connection means itself which primarily carries out the throttling task. In particular, the connection means itself preferably comprises no additional component parts such as valves or capillary tubes, but is instead itself arranged for the purpose of bringing about a primary pressure regulation in the sorption cooling device, in particular in the connection means between condenser and evaporator. In other words, it is preferable that the connection means represents a primary throttle device by means of which the pressure can be regulated preferably in, before and after the connection means.

A separate component part in the connection means, as described in the prior art, is associated with the disadvantage that these known separate component parts for throttling or pressure regulation, with regard to the pressure losses thereof or with regard to the adjustment range thereof, are greatly dependent on the process parameters within the sorption cooling device. As a result, it can happen that, in case of deviation from the initially set process parameters, conventional throttle devices such as capillary tubes or throttle valves no longer work or can no longer be operated as desired, in particular if they are used as separate component parts in connection means. The reason for this is, in particular, that the pressure difference in a sorption cooling device should preferably be changed slowly and, to the extent possible, should be kept constant, while other process parameters such as, for example, the refrigerant volume flow can vary considerably. Since the pressure difference in the above-mentioned throttle devices is generated dynamically, for example, by the refrigerant volume flow, this can result in considerable undesirable variations of the differential pressure. This can lead to a surge of the high pressure into the low-pressure container.

If, in a departure from the prior art, the connection means itself is designed as primary throttle device, it is possible surprisingly that this throttle device brings about the required pressure loss independently of the volume flow, in particular of the refrigerant volume flow, wherein this occurs preferably statically. In addition, the proposed throttle advantageously has a fixed self-adjustment range which, via other process parameters, preferably leads, to a predetermined extent, to an optimal operation of the sorption cooling device, without any resulting limitations with regard to the process parameters.

Furthermore, in the sense of the invention, it is preferable that the sorption chamber is present arranged fluidically substantially directly between the outlet from the evaporator and the inlet into the condenser. In the sense of the invention, this preferably means that, between evaporator and condenser, preferably only pipes and the sorption chambers are arranged, but no additional component parts are arranged. In the sense of the invention, this feature is preferably also referred to as "direct connection of the sorption chamber." In addition, it is preferable that the sorption cooling device can be operated without pumps. An operation without additional pumps is advantageous because it makes it possible to reduce the maintenance expenditure for the sorption cooling device. Furthermore, in this manner, the energy consumption, in particular, the electrical energy consumption, for the operation of the sorption cooling device can also be reduced or kept low, which positively influences the total energy efficiency of the sorption cooling device.

It is an essential merit of the invention that the sorption cooling device can be operated without additional pumps, and, at the same time, a pressure surge can be prevented effectively. In particular, this advantage is achieved by the combination of the features that the condenser is arranged deeper within the sorption cooling device than the evaporator in connection with the design of the connection means and, in particular with the feature that the connection means makes do without additional component part for the pressure regulation. This combination of the features represents a departure from the prior art for the average person skilled in the art. To date, the average person skilled in the art has had to assume that, in particular in the case in which water, ethanol or methanol is used as refrigerant, in addition to the pressure difference between high-pressure and low-pressure container, an additional pressure also needs to be generated, in order to reliably enable flow through the throttle device between the high-pressure and low-pressure containers, which, so far, has been implemented by an arrangement of the condenser above the evaporator or by a pump, for example. The additional pressure, by means of which the flow through the throttle device is made possible, here functions preferably as a "thrust pressure" or as a "shearing pressure."

The sorption cooling installation preferably consists of at least one evaporator, at least one condenser and at least one sorption chamber, wherein an outlet from the condenser is present connected by a connection means to an inlet into the evaporator. In the sense of the invention, the terms "outlet" and "inlet" preferably describe openings in the respective component parts or components of the sorption cooling installation into which preferably a connection means leads. In the sense of the invention it is preferable to use the terms "inlet" and "entrance" or "outlet" and "exit" synonymously. Moreover, in the sense of the invention it is preferable to use the terms "sorption cooling installation" and "sorption cooling device" synonymously. The terms "outlet" and "inlet" preferably also define a direction in which the refrigerant moves within the sorption cooling installation. In the sense of the invention, it is particularly preferable if the refrigerant flows from the evaporator to the sorption chamber, from the sorption chamber to the condenser, from the condenser into the connection means which can be formed by a U tube, and from the connection means back into the evaporator, whereby, advantageously, a circuit is formed. Fluidically, the outlet from the evaporator preferably leads into the sorption chamber, from the sorption chamber the vapor preferably goes into the condenser, and from the condenser the liquid goes preferably into the connection means and from there back again into the intake of the evaporator.

The term "outlet from the condenser" preferably describes an opening preferably in a lower area in a condenser of a sorption cooling installation, from which the refrigerant usually and during normal operation of the sorption cooling installation flows in order to reach a connection means. Here, in the sense of the invention, it can be preferable both that the opening preferably referred to as outlet is directed downward and also that it forms a lateral outlet of the condenser. The term "inlet into the evaporator" preferably denotes an opening in an upper area of an evaporator in a sorption cooling device, into which the connection means provided according to the invention between condenser and evaporator leads. Through this opening, which is preferably referred to as inlet, in the preferably upper area of an evaporator, the refrigerant located in the connection means and coming from the direction of the condenser outlet preferably flows. The inlet into the evaporator can preferably also occur from below or in the middle.

In the sense of the invention, it is preferable to arrange the mentioned component parts so that an outlet from the condenser is in a lower position than an inlet into the evaporator. The terms "lower," "deeper," "in upper position" or "in lower position" are unclear for the average person skilled in the art, since he knows that, in cooling installations, the condenser is usually present arranged above the evaporator, so that an evaporator is present arranged preferably "below" in a cooling installation and a condenser is preferably "above." In other words, the evaporator within a cooling installation is preferably arranged in the direction of a set-up level, for example, a floor of a space, while the condenser is present arranged in the direction of the upper closure of the refrigeration installation, for example, of a container cover or the like. The spatial directions "downward" or "upward" are also preferably defined accordingly. The terms "lower" and "deeper" thus preferably describe a situation in which a component part in a lower or deeper position is arranged beneath a component part in a higher position and preferably at a shorter distance from the set-up level, for example, the floor of the space. A component of the cooling installation in higher position, on the other hand, is preferably at a smaller distance from the upper closure of the cooling installation.

In an embodiment of the invention, the high-pressure container is arranged within the sorption device entirely or partially deeper than the low-pressure container. In other words, in the sense of the invention, it is preferable that the condenser is arranged deeper within the sorption cooling device than the evaporator. In another design of the invention, it is preferable that the connection means is designed as a throttle device. As a result, it is advantageously possible to operate the sorption cooling device without pumps. A particular advantage of the proposed sorption cooling device consequently consists in that the sorption cooling device can be operated without pumps. Thereby, the sorption cooling device can be operated advantageously in a particularly energy-efficient and low-maintenance manner.

In the sense of the invention, it is preferable that the sorption chamber is located fluidically between the outlet from the evaporator and the inlet into the condenser. This preferably means that the refrigerant, which is preferably supplied from the evaporator in vapor form into the condenser in order to be condensed there, is first sorbed in the sorption chamber. In the sense of the invention, it is preferable that the condenser is present apart from the sorption chamber as a separate container. The connection means, which connects the outlet from the condenser to the inlet into the evaporator, is preferably also present apart from the sorption chamber and flows through said sorption chamber in a particularly preferable embodiment of the invention. It is particularly preferable that the liquid which circulates in the sorption cooling device is a refrigerant, preferably water or ethanol, but also ammonia or methanol. The average person skilled in the art knows that water is the chemical compound having the empirical formula H2O, ethanol is the monovalent alcohol having the empirical formula C2H6O, and methanol is the monovalent alcohol having the empirical formula C1H4O, and ammonia is the chemical compound having the empirical formula NH3, wherein these compounds occur as natural refrigerants in nature. It is preferable that the refrigerant is capable of transporting thermal energy, wherein, preferably, at low temperature and low pressure, heat is absorbed, and, at higher temperature and lower pressure, heat is released. In the use of natural refrigerants, it is advantageous that they do not release chlorofluorocarbons when used as work medium and thus do not contribute to the decomposition of the ozone layer and to promoting the greenhouse effect.

In a preferred embodiment of the invention, the connection means is a U tube. The connection means moreover can form a rising pipe, in which the refrigerant preferably migrates from the condenser outlet in the direction of the evaporator inlet, or rises within the connection means. Preferably, the condenser is in thermal contact with the environment of the sorption cooling device.

In the sense of the invention, it is preferable to designate the side of the connection means which faces the condenser as "condenser side" of the connection means, while the side of the connection means facing the evaporator is preferably designated as "evaporator side." These designations apply particularly also if the connection means is formed by a U tube, wherein the arm of the U tube which, in the area of the condenser outlet, leads into the condenser is preferably designated as a "condenser side" or "condenser arm," and the arm of the U tube which, in the area of the evaporator inlet, leads into the evaporator is preferably designated as an "evaporator side" or "evaporator arm" of the U tube.

In the sense of the invention it is preferable that the refrigerant is conveyed against the force of gravity as a result of the inventive arrangement of the condenser outlet and of the evaporator inlet with respect to one another. This represents an essential departure from the prior art, since, in sorption cooling installations, the condenser is usually present arranged above an evaporator, so that the condensed refrigerant, exploiting the force of gravity, can arrive from the condenser in the evaporator. To date, it has been assumed in professional circles that an alternative arrangement of these component parts does not lead to a sorption cooling installation or does not lead to an efficiently working sorption cooling installation. Surprisingly, the inventive arrangement of the sorption cooling device is associated with several advantages. In particular, the advantages achieved by the invention consist in that the connection means can no longer be blown completely dry as a result of undesired generated vapor bubbles or pressure surges. This can preferably be explained by the fact that the vapor bubbles form only in the rising pipe, i.e., preferably on the evaporator side, on the way from the condenser to the evaporator, and, in particular, preferably above a filling level of the refrigerant in the connection means, which has been reached at the same time on the condenser side, or above a filling level in the condenser. Since the filling quantity of the refrigerant in the rising pipe is usually considerably smaller than the remaining refrigerant quantity in the condenser or condenser sump, this advantageously leads to the fact that the volume which has been displaced in the rising pipe by the rising vapor bubbles can be filled directly with the remaining refrigerant which is preferably still in the condenser and/or in the condenser sump and/or still present in the connection means.

Due to the possibility of filling the volume that has been displaced by the vapor bubbles rapidly again with refrigerant, a blowback of the high pressure, for example, from the condenser into the low-pressure container, for example, the evaporator, is prevented particularly effectively. Surprisingly, at the same time, a firmly defined self-adjustment range for the pressure reduction, which can be set particularly accurately by the height of the inlet into the connection means, or by the height of the filling level in the condenser sump and the height of the outlet, or by the arrangement of these component parts of the sorption cooling device with respect to one another. As a result, depending on the pressure difference, preferably at any time during the operation of the sorption cooling device, a certain liquid volume can remain in the condenser sump. In the sense of the invention it is preferable that the term "pressure difference" describes the difference between the pressures in the different containers within the sorption cooling installation, for example, the pressure difference between the pressures in the evaporator and in the condenser.

Due to the possibility that a certain liquid volume can remain in the condenser sump, as an additional advantage of the inventive arrangement, the evaporator of the sorption cooling device is not flooded excessively. Thereby, it is ensured that the heat exchange surfaces can be used particularly effectively, and, surprisingly, sufficient vapor space remains free at the same time. Another advantage consists in that, due to the collection in the sump, the liquefied vapor remains advantageously for a particularly long duration in the condenser, whereby the liquid can be cooled more strongly, which can lead to lower thermal loss at the time of the flow through the connection means and the inflow into the evaporator. In particular, the undesired heat introduction into the evaporator due to the hot refrigerant from the condenser, which has been described in the prior art, is greatly minimized thereby.

According to the invention, it is provided to arrange the inlet into the evaporator so that it is elevated or higher-lying in comparison to the outlet from the condenser. Due to the inventive arrangement of the evaporator inlet above the condenser outlet, the predetermined space within a sorption cooling device can be exploited particularly well, since, in particular, the condenser can be arranged freely between the other component parts of the sorption cooling device and, in particular, no longer has to be above the evaporator. The arrangement of the higher-lying evaporator, which is also made possible thereby, enables, in particular in the case of direct cooling of a space with the evaporator, a better cold transfer to the space to be cooled than is possible with other systems and/or cooling installations which work without pumps. It was entirely surprising that this advantage can also be achieved with condensers of large design. In addition, it was surprising that, due to the inventive arrangement of the component parts, an automaticity of the sorption cooling device according to the invention can be achieved. An example of this is the self-regulation which is preferably the result of the fact that, due to the operation of the connection means against the force of gravity, both a minimum and a maximum preliminary pressure can be predetermined as a result of the geometry, whereas, in conventional sorption cooling installations only the maximum pressure difference between the containers can be set for the operation. The self-regulation range via the connection means is clearly improved further, since this connection means is no longer blown completely dry due to undesired vapor bubbles or pressure surges, and any free volume formed by vapor bubbles can be filled rapidly with refrigerant. In particular, the automaticity of the sorption cooling device allows operation of the sorption cooling device without moving wearing parts, whereby advantageously not only a long useful life of the installation is achieved, but, in addition, an operation of the inner circuits within the sorption cooling device without pumps and without current is possible. At the same time, the inventive cooling installation can be rapidly ramped up again from a resting state, in particular from the switched-off state, since, preferably at any time of the operation, refrigerant remains in the condenser. In known cooling installations usually enough heat has to be supplied at first, until the condenser has been filled again with enough expelled refrigerant, or else a valve has to be provided between condenser and evaporator. The latter has to be switched either manually or using external energy, which in the sense of the invention is preferably not desirable.

In a preferred embodiment of the invention, dimensions of the connection means can be selected as a function of pressure conditions within the sorption cooling device. In the sense of the invention, it is preferable that the connection means has dimensions which are selected as a function of pressure conditions within the sorption cooling device, in such a manner that the sorption cooling device achieves an optimal performance. For example, the length of the rising pipe of the connection means can be selected so that the hydrostatic pressure generated by the liquid refrigerant corresponds to the maximum expected pressure difference between condenser and evaporator precisely when the condenser side of the connection means is substantially empty. For the same application or for other applications it can moreover be preferable that the difference in height between outlet from the condenser and inlet into the evaporator, in the case of a substantially completely filled connection means, results in a hydrostatic pressure of the refrigerant which corresponds to the minimum expected pressure difference between evaporator and condenser during operation. This represents an additional improvement in comparison to the prior art, in which only the maximum pressure difference of the throttle device can be set, while, however, no static minimum pressure difference between two containers of different pressure could be maintained, which always led to refrigerant collecting disadvantageously in a container, particularly during a standstill of the cooling installation.

Preferably the sorption chamber also has an outlet which, in a preferred embodiment of the invention, is arranged on or above the sorption chamber center, i.e., the sorption chamber outlet is preferably located on or above a center of the sorption chamber. This is advantageous, since the vapor rises upward after the desorption, whereby this upward movement would have to be countered if the outlet were positioned in a lower area of the sorption chamber. The preferred arrangement at mid-height advantageously enables the possible arrangement of the individual component parts of the sorption cooling device in particular freely in the space.

In another embodiment of the invention, valves can be arranged between sorption chamber and condenser, or between evaporator and sorption chamber. In the sense of the invention, it is particularly preferable that at least one valve is present arranged between the sorption chamber and the condenser and/or between the evaporator and the sorption chamber. For example, in adsorption cooling installations, in the desorption phase, the valves prevent the refrigerant vapor from unpredictably flowing in vapor form directly back into the evaporator instead of flowing into the condenser as desired and condensing there. In addition, already condensed refrigerant is prevented from vaporizing again in the adsorption phase and flowing from the condenser back into the sorption chamber. The valves can be designed, for example, as automatic and/or pressure-driven check valves, for example, lip valves. This is particularly advantageous for preventing a manual and/or electrical operation of the valves, which is undesirable in the context of a sorption cooling device.

In the sense of the invention it is preferable that the sorption chamber, the evaporator and the condenser are present separately, i.e., as separate component parts of the sorption cooling device. In particular, a sorption cooling device can be provided with several sorption chambers for a very small installation space, whereby a particularly continuous provision of cold is ensured. This is advantageously achieved in that several sorption chambers can be operated with one evaporator or one condenser. For example, the individual sorption chambers can be switched and/or operated in a temporally staggered, in such a manner that the refrigerating capacities of the individual chambers, which may vary, add up to an optimal total refrigerating capacity of the entire device comprising several sorption chambers. In the sense of the invention it is preferable that the sorption chamber comprises a sorption medium or that the sorption chambers comprise a sorption medium, in which the adsorption and/or absorption processes preferably occur.

In a preferred embodiment of the invention, a condensate reservoir is arranged between the outlet from the condenser and the connection means or in the condenser side of the connection means. In the sense of the invention, it can be particularly preferable to provide an additional condensate reservoir before the inlet into the connection means which is preferably formed by a U tube. Thereby, it is advantageously made possible to reserve preferably as large as possible a proportion of the condenser volume, particularly preferably the entire condenser volume, for the vapor to be liquefied, and to reserve the liquid outside of the condenser. This preferred embodiment has been found to be particularly effective in connection with condensers that are optimized for pure vapor, preferably water vapor.

In the sense of the invention, it is preferable that the condensate reservoir is formed, for example, as an additional volume within the condenser arm of the connection means and/or is present arranged beneath the condenser. It is preferable that the condensate reservoir is in thermal contact with the environment, in order to particularly effectively cool the liquid which has preferably accumulated in the condensate reservoir to a temperature range in the vicinity of the environmental temperature. This preferably means that the temperature of the liquid in the condensate reservoir is cooled to the environmental temperature. The diameter of the condensate reservoir should preferably exceed 5 cm, i.e., it should be greater than 5 cm, in order to enable free convection and thus a thorough mixing of the refrigerant during the cooling of the condensate. Smaller diameters are also possible for this purpose, but they may impede free convection.

In a preferred embodiment of the invention, the connection means forms a rising pipe, wherein a refrigerant reservoir is arranged in the rising pipe. In the sense of the invention it can be preferable to provide a refrigerant reservoir in the rising pipe of the connection means, preferably of the U tube, for a greater prevention of a pressure surge between condenser and evaporator of the sorption cooling device. It is particularly preferable if the refrigerant reservoir is present arranged before the evaporator, so that the vapor bubbles possibly forming can flow through the refrigerant, without, for example, pushing all the refrigerant ahead of itself and thus pressing it completely out of the connection means. In this preferred embodiment of the invention, the refrigerant located in the reservoir can flow back into the connection means, so that, advantageously, the required counter-pressure between condenser and evaporator can be generated again.

It is preferable in the sense of the invention that the refrigerant reservoir preferably has at least exactly as much volume as the rising pipe without refrigerant reservoir. In other words, it is preferable that the volume of the refrigerant reservoir is as large as or greater than the volume of the rising pipe alone, i.e., without refrigerant reservoir. The refrigerant reservoir is preferably located in the rising pipe at the height of the outlet from the condenser or above said outlet. It is particularly preferable that the refrigerant reservoir is present arranged at mid-height between condenser outlet and evaporator inlet, wherein the evaporator inlet preferably also forms the outlet from the connection means.

If the refrigerant is introduced into the evaporator preferably from below, a clear cross section enlargement at the end of the connection means can occur advantageously directly at the evaporator, and said connection means is then connected, preferably with this enlarged cross section, directly to the evaporator. This results, for example, in the refrigerant reservoir, in the possibility of allowing the vapor bubbles to flow past, wherein, advantageously, the evaporator sump is additionally available as a reservoir for the direct return flow of refrigerant into the connection means.

In a preferred embodiment of the invention, the connection means comprises a local high point. For example, the U tube which can be used as connection means can preferably have a local high point preferably on the evaporator side, whereby, advantageously, a higher maximum pressure is predetermined by the geometry than would be possible, if needed, as a result of only the difference in height between condenser outlet and evaporator inlet. Providing a local high point in the area of the connection means can be preferable, in the sense of the invention, for example, if the evaporator should not be located above the condenser or not considerably above it, or if, due to high environmental temperatures, a large pressure difference must be generated between evaporator and condenser, and thus a very high difference in height is necessary. Before the outlet into the evaporator, a cross section enlargement is preferably provided, in order to ensure that the outlet line is free of refrigerant so that with this embodiment the maximum possible counter-pressure with this embodiment is not lowered undesirably. The term "before the outlet" is not unclear to the average person skilled in the art. It is preferable that the connection means protrudes through the inlet into the evaporator, and that the refrigerant flows out at the end of this line. For this purpose, it is proposed that the connection means widens, i.e., broadens, so that a cross section enlargement is preferably formed. The cross section enlargement can occur preferably in flow direction directly behind the high point. When viewed from the inner space of the evaporator, the opening of the evaporator, into which the connection means leads, can be considered an outlet, before which—when viewed from the inner side of the evaporator—the cross section enlargement of the connection means occurs before this outlet. This becomes clear particularly in FIG. 6.

In a preferred embodiment of the invention, the sorption cooling device comprises a drain pipe from the evaporator, wherein the drain pipe and the connection means extend substantially parallel to one another at least in sections. Due to the running, which is preferably parallel at least in sections, of connection means and drain pipe from the evaporator, a contact area forms advantageously for heat transfer from the condensate to the refrigerant vapor which preferably heats up during the sorption. This embodiment is particularly preferable if, at the same time, a local high point in the connection means is provided. In particular, by means of this embodiment of the invention, a possible overheating of the condensate can be dissipated particularly effectively.

In a preferred embodiment of the invention, the rising pipe of the evaporator side of the connection means is run completely or partially within the space to be cooled, preferably with direct thermal contact with the space to be cooled. Preferably, the rising pipe, on the evaporator side of the connection means, is arranged completely or partially within the cooling space, whereby, preferably, a thermal contact exists between the connection means formed as rising pipe and the space to be cooled. It is particularly preferable to run this rising pipe inside the evaporator. In the sense of the invention, it is preferable to designate the side of the connection means which faces the evaporator and which can be formed, for example, as a U tube or rising pipe, as evaporator side of the connection means.

Advantageously, the proposed arrangement leads to a considerable reduction of the vapor bubble formation, since, during the pressure reduction at the time of the rise in the rising pipe, the refrigerant is cooled at the same time and therefore does not overheat. Thereby, a possible pressure blowback from the condenser to the evaporator can advantageously be prevented even more effectively. If the rising pipe is designed to be particularly thick, then the flow rate in this pipe is particularly slow, and the refrigerant contained is then advantageously also used as cold storage for the cooling space. If the rising pipe is designed to be broader than 5 cm, for example, a mixing of the warmer refrigerant which has newly flowed into the rising pipe with the colder refrigerant already located in the rising pipe occurs, which leads to a particularly uniform low temperature in the rising pipe section which is in direct thermal contact with the cooling space and thus again contributes to a more effective prevention of a possible pressure surge.

In a preferred embodiment of the invention, the sorption cooling device comprises a gas trap. In the sense of the invention, it is preferable that, at the preferably highest point of the connection line between evaporator and sorption chamber, a container is arranged, which preferably forms a gas trap. Since the incondensable gases usually have a lower density than the refrigerant vapor, said gases rise upward and collect preferably in the gas trap of the sorption cooling device. Gases that are heavier than the refrigerant vapor are advantageously entrained upward with the flow. In the sense of the invention, incondensable gases can form preferably due to outgassing, leakage and/or corrosion.

Advantageously, a large proportion of these incondensable gases can collect, during the flow through the connection line, in the container located above which preferably forms the gas trap. This advantageously makes it possible that a large proportion of the incondensable gases is kept away from the remaining process and does not impede said process. In particular, the mass transfer within the sorption cooling device is not disturbed thereby. To prevent the gas trap from being completely filled with the incondensable gases, as a result of which its function could no longer be ensured, a drain line is located on the upper side of the container which preferably forms the gas trap, through which drain line the incondensable gases can be suctioned, for example, by means of a vacuum pump. During the normal operation of the sorption cooling device, the drain line is closed preferably by means of a vacuum-tight valve. In a departure therefrom, the gas trap can be arranged at a local low point in the connection line between evaporator and sorption chamber if water is used as refrigerant, since most gases have a clearly higher density than water vapor and can thus collect better in a lower-lying gas trap. When a gas trap is used, the valve located between evaporator and sorption chamber should preferably be arranged in the area between evaporator and gas trap.

Figure 2:
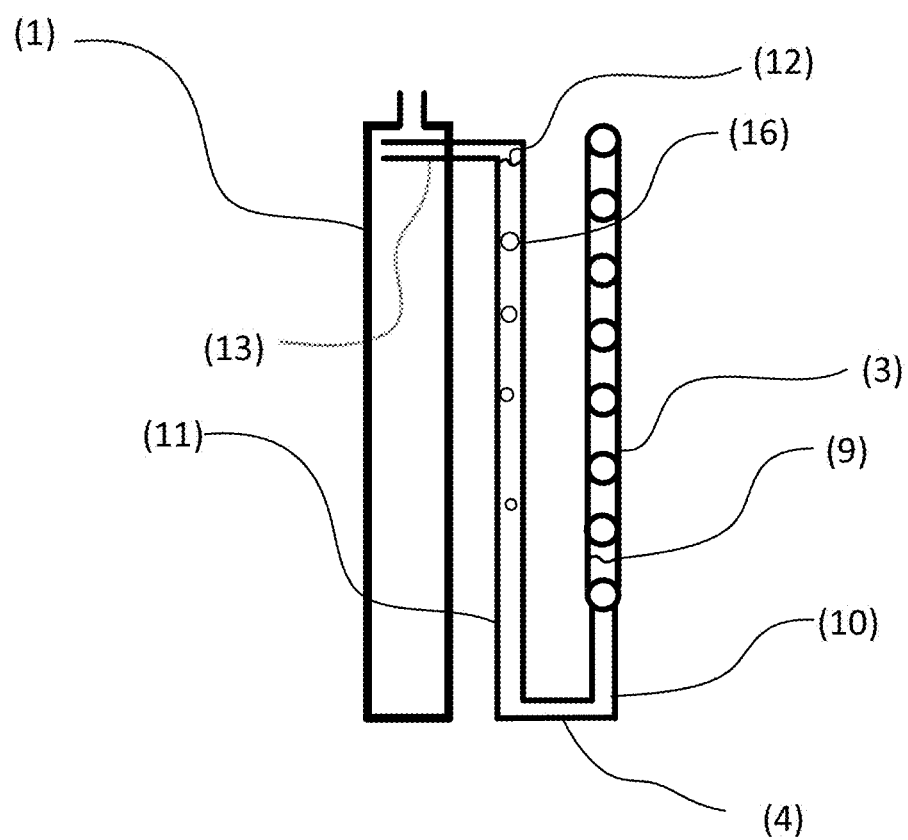
Figure 3:
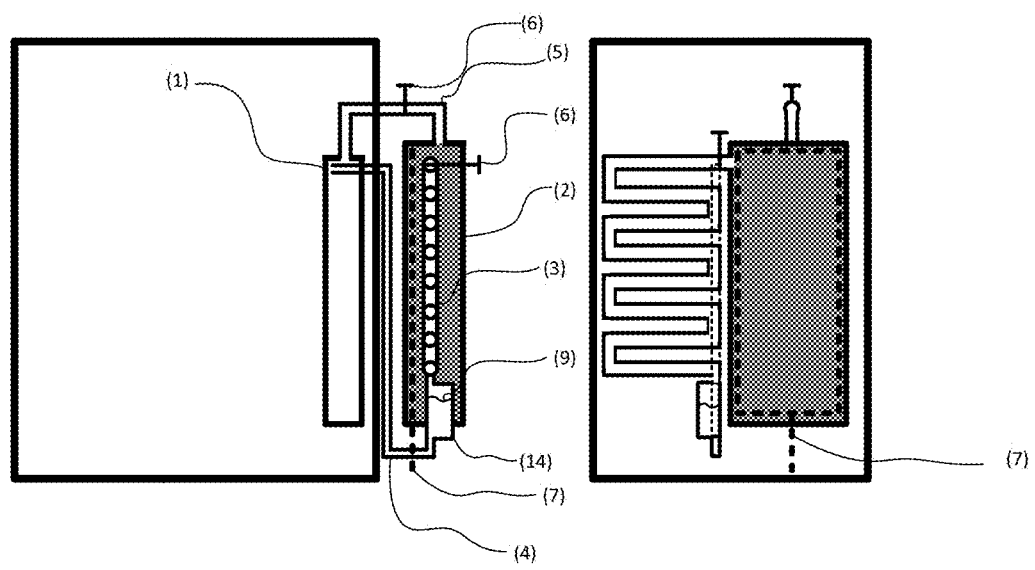
Figure 4:
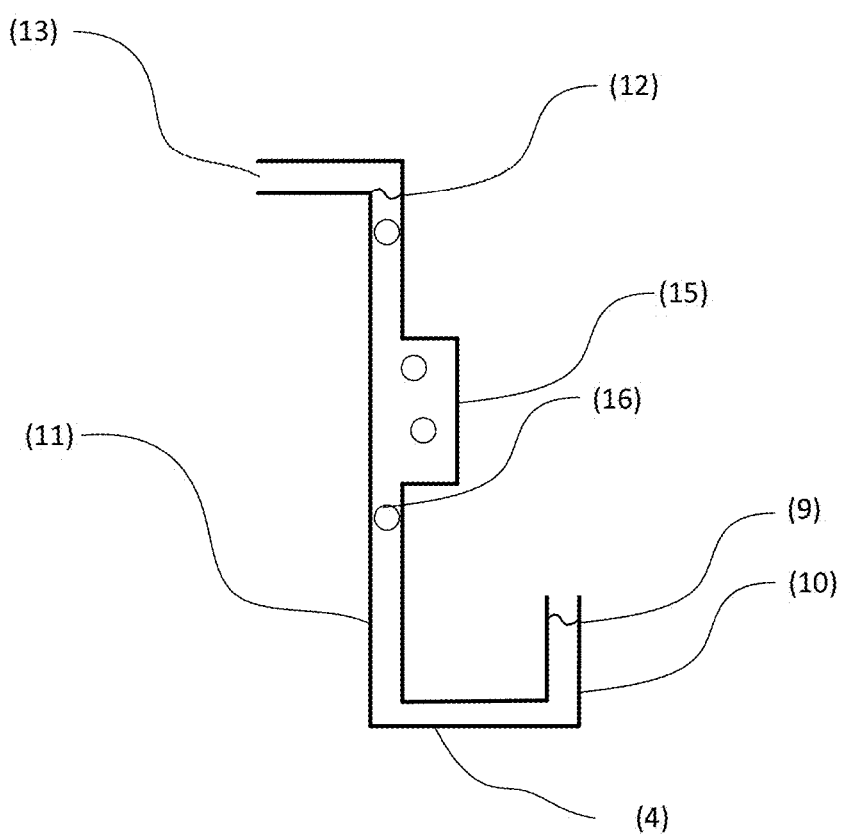
Figure 5:
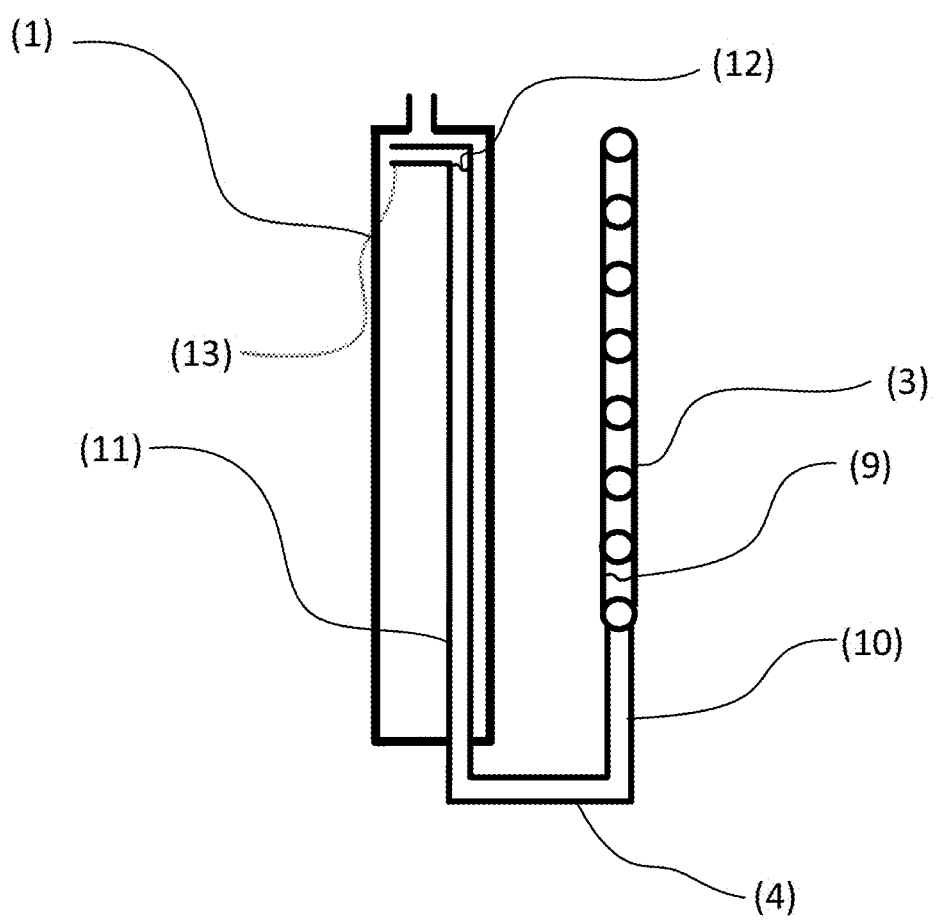
Figure 6:
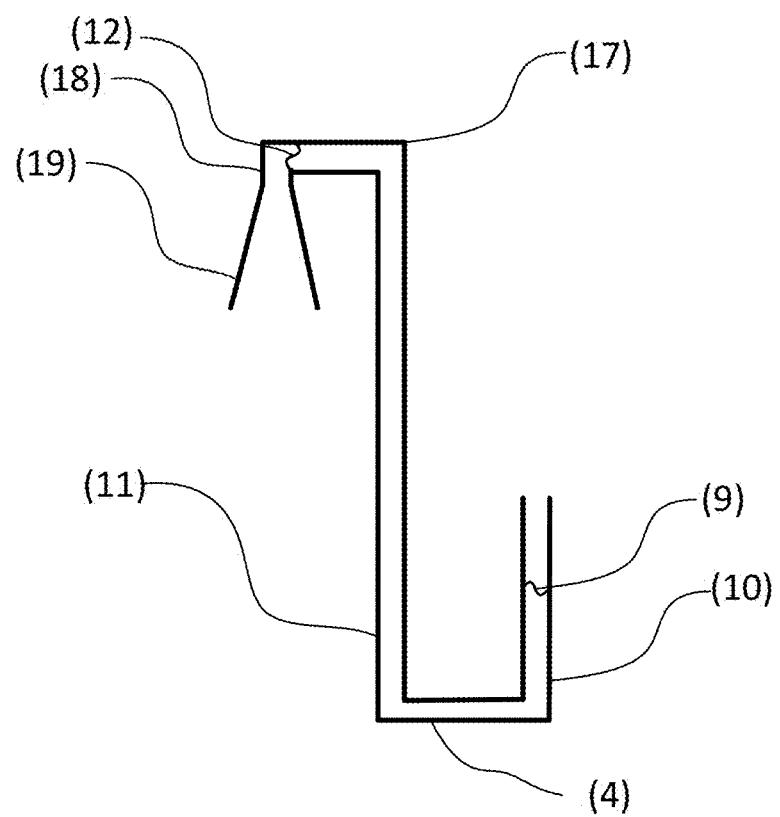
Figure 7:
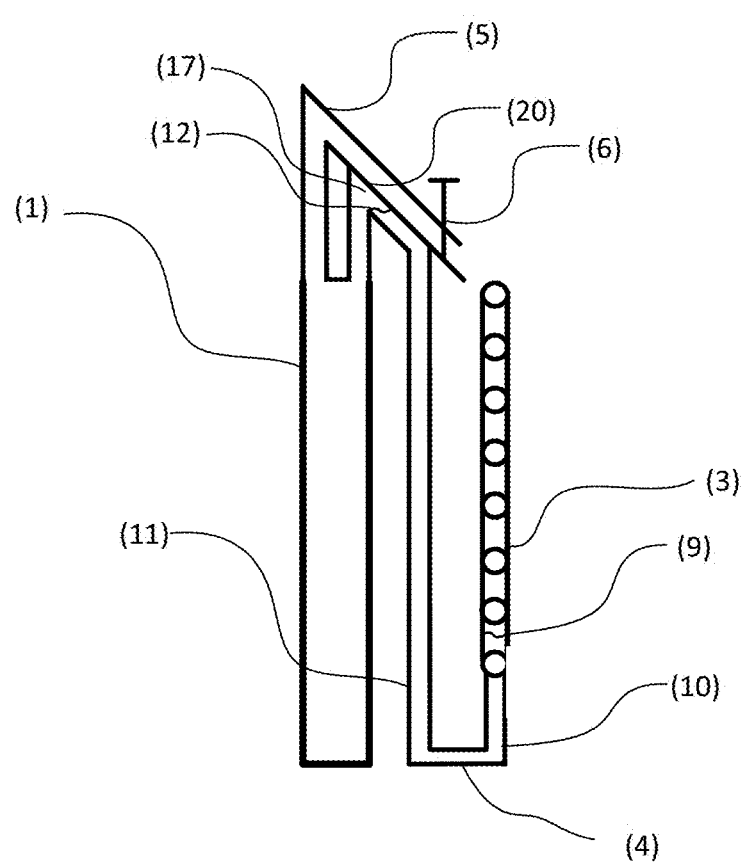
Figure 8:
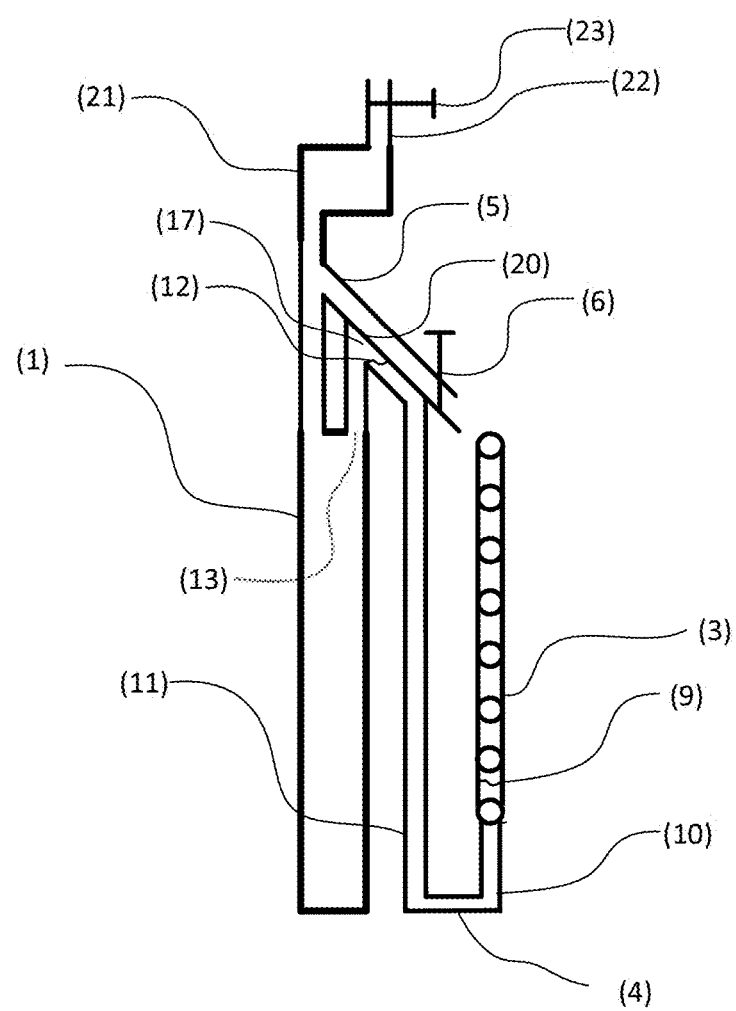

Particularly preferable embodiments are shown in the appended figures, but the invention is not limited to these embodiments. In the drawings, FIG. 1 shows a preferred embodiment of the sorption cooling installation comprising at least one evaporator, a sorption chamber and a condenser FIG. 2 shows a preferred embodiment of the connection means with evaporator and condenser FIG. 3 shows a preferred embodiment of the sorption cooling device with condensate reservoir FIG. 4 shows a preferred embodiment of the connection means of the sorption cooling device with refrigerant reservoir FIG. 5 shows a preferred form of arrangement of the connection means of the sorption cooling device FIG. 6 shows a preferred embodiment of the connection means of the sorption cooling device with high point and cross section enlargement before the outlet FIG. 7 shows a preferred embodiment of the sorption cooling device with parallel running of connection means and drain pipe from the evaporator with simultaneous implementation of a high point in the connection means FIG. 8 shows a preferred embodiment of the sorption cooling device with gas trap FIG. 1 shows a preferred embodiment of the sorption cooling installation (8), comprising at least one evaporator (1), at least one sorption chamber (2) and at least one condenser (3), as well as a throttle which is preferably designed as a U tube and which forms a connection means (4) in the sense of the invention and is present arranged between the evaporator (1) and the condenser (3). Moreover, FIG. 1 shows two valves (6), wherein one of the valves (6) is present arranged in a connection means between evaporator (1) and sorption chamber (2). A second valve (6) is present arranged in an upper area of the condenser. The valves (6) can be designed as automatic and/or pressure-driven check valves, whereby no manual or electrical operation of the valves is necessary.

The at least one evaporator (1) is preferably in direct spatial and thermal contact with the space to be cooled (30). The at least one condenser (3) and the at least one sorption chamber (2) are preferably located completely outside of the space to be cooled (30) and are in direct thermal contact with an environment into which heat can be released. It is preferable that the sorption chamber (2) is supplied with heat for the expelling of the refrigerant. This can occur, for example, via an electric heater (7) which is arranged within the sorption chamber (2). In the sorption chamber (2), a preferably stationary sorption medium is located, in which the adsorption and/or absorption processes preferably occur.

The evaporator (1) and the condenser (3) should be arranged within the sorption cooling device (8) preferably in such a manner that an outlet from the condenser (3) is lower lying than an inlet into the evaporator (1). FIG. 1 shows moreover that the sorption chamber (2) is present arranged fluidically between the outlet from the evaporator (1) and the inlet into the condenser (3). An outlet from the sorption chamber (2) is located on or above a center of the sorption chamber (2). Between the outlet from the condenser (3) and the inlet into the evaporator (1), a connection means (4) is arranged, which can preferably be designed as a U tube with clearly defined dimensions, wherein the dimensions of the connection means (4), preferably of the U tube, are selected as a function of the pressure application range of the sorption cooling installation (8). The length of a rising pipe (11), that is to say preferably of the evaporator side of the U tube, which can be formed by the connection means, corresponds, for example, to the maximum expected pressure difference between condenser (3) and evaporator (1), and the difference in height between the outlet from the condenser (3) and the inlet into the evaporator (1) corresponds to the minimum expected pressure difference between evaporator (1) and condenser (3) during operation.

FIG. 2 shows a preferred embodiment of the connection means (4) with evaporator (1) and condenser (3), in particular the connection means (4) which is designed as a U tube. Represented are the two U arms of the U tube, which are preferably designated as evaporator arm or evaporator side (11) and as condenser arm or condenser side (10) of the connection means (4). Preferably, the evaporator side (11) corresponds to the arm of the U tube which faces the evaporator (1) or is located closest to said evaporator, while the condenser side (10) preferably faces the condenser (3) of the sorption cooling device (8). In the sense of the invention, it is preferable that the evaporator side (11) of the U tube forming the connection means (4) is designated as a rising pipe and marked with reference numeral (11). In the sense of the invention, it is also preferable that the condenser side (10) of the U tube, which preferably forms the connection means (4), is designated as trap line with reference numeral (10).

The evaporator comprises an outlet (13) representing the end of the connection means (4) and protruding into the evaporator (1). In the connection means (4), a liquid, preferably a refrigerant, is present, having preferably different filling levels (9 and 12) on the two sides of the connection means (4). In the sense of the invention it is preferable that the filling level on the condenser side (10) of the connection means (4) is designated with reference numeral (9), and the filling level on the evaporator side (11) of the connection means (4) is designated with reference numeral (12). As an example, on the evaporator side of the connection means (11), the vapor bubbles (16) are shown, which can form there typically starting at a rise height above the condenser filling level (9).

FIG. 3 shows a preferred embodiment of the sorption cooling device (8) with condensate reservoir (14). An additional condensate reservoir (14) can be provided, in order to reserve the complete volume of the condenser (3) for the vapor to be liquefied, and in order to reserve the liquid, preferably the refrigerant, outside of the condenser (3). The condensate reservoir (14) is preferably in thermal contact with the environment of the sorption cooling device (8), in order to cool the liquid to environmental temperature. In addition, FIG. 3 shows the valves (6) in the connection means between evaporator (1) and sorption chamber (2) and in the upper area of the condenser (3), as well as the electric heater (7) which is present arranged within the sorption chamber (2). In the sense of the invention, it is preferable to designate the connection means between evaporator (1) and sorption chamber (2) as drain pipe (5). Reference numeral (9) indicates the filling level of the liquid in the condensate reservoir (14).

FIG. 4 shows a preferred embodiment of the connection means (4) of the sorption cooling device (8) with refrigerant reservoir (15), in particular a U tube with refrigerant reservoir (15). In the preferred embodiment of the invention represented in FIG. 1, the refrigerant reservoir (15) is formed by an enlarged area of the evaporator side (11) of the connection means (4). In other words, the refrigerant reservoir (15) is located within the rising pipe (11) which is formed by the connection means (4). The connection means (4) is filled with refrigerant, the filling levels (9 and 12) of which, in the two arms (10 and 11) of the connection means (4), are also represented in FIG. 1. The refrigerant reservoir (15) is present particularly preferably at mid-height between the two filling levels (9 and 12). In the refrigerant, vapor bubbles (16) can form, which can move partially through the refrigerant, but, without the refrigerant reservoir (15), they would for the most part push said refrigerant ahead of themselves. The evaporator-side closure of the connection means (4) preferably forms an outlet (13).

In another preferred design of the invention, the refrigerant reservoir (15) can be provided at the end of the rising pipe (11), if the refrigerant is introduced, for example, from below into the evaporator (1). Advantageously, this preferably enables the possibility of allowing any vapor bubbles (16) to flow past, wherein, in addition to the refrigerant reservoir (15), the evaporator sump is available as a reservoir for the direct return flow of refrigerant—preferably due to the force of gravity—into the U tube (4), whereby, advantageously, the refrigerant reservoir (15) can be designed with a smaller volume.

FIG. 5 shows a preferred form of arrangement of the connection means (4) of the sorption cooling device (8), in which a large portion of the rising pipe (11) of the connection means (4) is located within the evaporator (1). Also represented are other U arms, the condenser side (10) of the connection means (4) as well as the condenser (3) with its filling level (9). In contrast to FIGS. 2 and 4, in the rising pipe (11), there are no vapor bubbles (16) present here between height of the filling level in the condenser (9) and filling level in the evaporator (12), since the refrigerant is here in the undercooled state, and consequently no vapor bubbles can form. This is made possible by the preferred arrangement of the rising pipe (11) of the connection means (4) within the evaporator (1) with direct thermal contact with the evaporator (1), whereby, preferably in the entire rising pipe within the evaporator (1), substantially the same temperature is reached as at the outlet of the connection means (13) and in the evaporator (1).

The evaporator (1) has an outlet (13) which represents the end of the connection means (4) and which protrudes into the evaporator (1). In the connection means (4), a liquid, preferably a refrigerant, is present, having preferably different filling levels (9 and 12) on the two sides of the connection means (4). In the sense of the invention, it is preferable that the filling level on the condenser side (10) of the connection means (4) is designated with reference numeral (9), and the filling level on the evaporator side (11) of the connection means (4) is designated with reference numeral (12). As an example, on the evaporator side of the connection means (11), the vapor bubbles (16) are shown, which can form there typically starting at a rise height above the condenser filling level (9).

FIG. 6 shows a preferred embodiment of the connection means (4) of the sorption cooling device (8) with local high point (17) and cross section enlargement (19) before the outlet (13). It is preferable that the connection means (4) protrudes through the inlet into the evaporator (1) and can also widen within the evaporator (1), i.e., in particular it can be broadened so that, preferably, a cross section enlargement (19) is formed. It is particularly preferable that the enlargement (19) is directly adjacent to the high point (17), i.e., it is present arranged directly behind the high point (17). When viewed from the inner space of the evaporator (1), the opening of the evaporator (1) into which the connection means (4) leads can be considered an outlet, before which—when viewed from the inner side of the evaporator (1)—the cross section enlargement (19) of the connection means (4) before this outlet occurs.

In addition, FIG. 6 shows a local high point (17) of the connection means (4) which is preferably present arranged in the area of the inlet or before the inlet of the connection means (4) into the evaporator (1). It is preferable that the local high point (17) represents the highest point of the connection means (4), wherein the above definitions of "above," "below," "high" and "deep" are applicable. Accordingly, the local high point (17) of the connection means (4) has a maximum distance from a floor of a space or from a set-up level of the sorption cooling device (8) and a minimum distance from an upper closure of the sorption cooling device (8) in comparison to the other points of the connection means (4). In the sense of the invention, it can be preferable that the local high point (17) is also present arranged above the absolute high point of the rest of the sorption cooling installation, for example, of the gas trap.

In FIG. 6, the filling levels (9 and 12) in the evaporator side (11) and in the condenser side (10) of the connection means (4) are represented, and an outlet line (18) is represented in the area of the outlet (13), i.e., the end area of the connection means (4) which protrudes into the evaporator (1), before this area of the connection means (4) widens to the cross section enlargement (19). The cross section enlargement (19) can start preferably outside of the evaporator (1) or as close as possible to the high point (17).

The local high point (17) on the evaporator side (11) of the connection means (4) enables the generation of a particularly high maximum pressure which is elevated in particular with respect to the difference in height between condenser outlet and evaporator inlet. This can be particularly advantageous, for example, if the evaporator (1) is placed not above or not clearly above the condenser (3) or if, due to high environmental temperatures, a large pressure difference between evaporator (1) and condenser (3) is desirable, and thus a very large difference in height between evaporator (1) and condenser (3) is necessary.

FIG. 7 shows a preferred embodiment of the sorption cooling device (8) with parallel running of connection means (4) and drain pipe (5) from the evaporator (1) in the case of simultaneous implementation of a local high point (17) in the connection means (4). Represented as an example are a parallel running of U tube (4) and drain pipe (5) from the evaporator (1) and a contact area (20) between the drain pipe (5) and the rising pipe (11). By means of this contact area (20) of the U tube (4), heat can be transferred from the condensate to the refrigerant vapor. Also represented in FIG. 6 are the filling levels (9 and 12) in the evaporator side (11) and in the condenser side (10) of the connection means (4), as well as a valve (6) in the drain pipe (5).

FIG. 8 shows a preferred embodiment of the sorption cooling device (8) with gas trap (21), which is arranged over the evaporator (1) at a high-lying site within the sorption cooling device (8). The gas trap (21) can be used in order to catch incondensable gases and collect them in the collection container which preferably forms the gas trap (21), so that they advantageously do not reach the sorption chamber (2) again, where they may interfere with the ongoing processes for generating cold.

It is preferable that the gas trap (21) is arranged at a preferably highest point of the drain pipe (5) between evaporator (1) and sorption chamber (2). Since incondensable gases usually have a lower density than the refrigerant vapor, they rise upward and collect preferably in the gas trap (21). To release the incondensable gases, on the upper side of the gas trap (21) a drain line (22) is provided, through which the incondensable gases can be suctioned, for example, by means of a vacuum pump. During the normal operation of the sorption cooling device (8), the drain line (22) can be closed via a vacuum-tight valve (23).

LIST OF REFERENCE NUMERALS

1 Evaporator
2 Sorption chamber
3 Condenser
4 Connection means
5 Drain pipe
6 Valve
7 Electric heater
8 Sorption cooling device
9 Filling level on the condenser side of the connection means
10 Condenser side of the connection means
11 Evaporator side of the connection means or rising pipe
12 Filling level on the evaporator side of the connection means
13 Outlet in the evaporator
14 Condensate reservoir
15 Refrigerant reservoir
16 Vapor bubbles
17 Local high point 18 Outlet line
19 Cross section enlargement
20 Contact area
21 Gas trap
22 Drain line
23 Vacuum-tight valve
30 Space to be cooled

The invention claimed is:

1. A sorption cooling device comprising at least one evaporator, a condenser and a sorption chamber, wherein an outlet from the condenser is connected via a connection means to an inlet into the evaporator, wherein the connection means is configured as a throttle device, wherein the outlet from the condenser is arranged deeper in the sorption cooling device than the inlet into the evaporator and the sorption chamber is arranged fluidically between the outlet from the evaporator and the inlet into the condenser, wherein the sorption cooling device can be operated without pumps and wherein the connection means is filled at least partially with liquid refrigerant.

2. The sorption cooling device according to claim 1, wherein dimensions of the connection means can be selected as a function of pressure conditions within the sorption cooling device.

3. The sorption cooling device according to claim 1, wherein an outlet from the sorption chamber is arranged on or above a center of the sorption chamber.

4. The sorption cooling device according to claim 1, wherein at least one valve is arranged between the sorption chamber and the condenser and/or between the evaporator and the sorption chamber.

5. The sorption cooling device according to claim 4, wherein the at least one valve is an automatic and/or pressure-driven check valve.

6. The sorption cooling device according to claim 1, wherein a condensate reservoir is arranged between the outlet from the condenser and the connection means or in the condenser side of the connection means.

7. The sorption cooling device according to claim 1, wherein the connection means forms a rising pipe, wherein a refrigerant reservoir is arranged in the rising pipe and/or the connection means is a U pipe.

8. The sorption cooling device according to claim 7, wherein on an evaporator side of the connection means, the rising pipe is arranged completely or partially within the space to be cooled.

9. The sorption cooling device according to claim 7, wherein the rising pipe is in direct thermal contact with the evaporator.

10. The sorption cooling device according to claim 1, wherein the connection means comprises a local high point.

11. The sorption cooling device according to claim 1, wherein the sorption cooling device comprises a drain pipe from the evaporator, wherein the drain pipe and the connection means extend substantially parallel to one another at least in sections.

12. The sorption cooling device according to claim 1, wherein the sorption cooling device comprises a gas trap.

13. The sorption cooling device according to claim 1, wherein the condenser is arranged deeper within the sorption cooling device than the evaporator.

* * * * *